Dec. 15, 1959  W. D. HINCHLIFFE  2,917,257
SUPPORTS
Filed Aug. 23, 1954
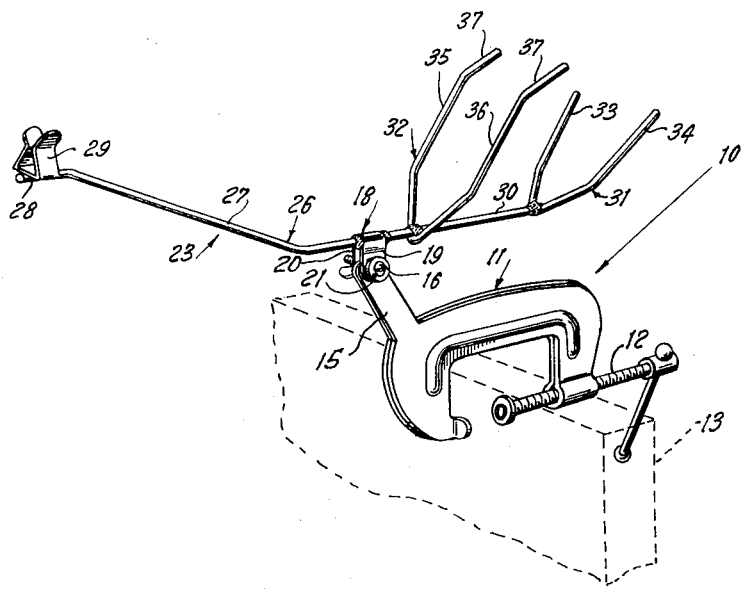
Fig. 1
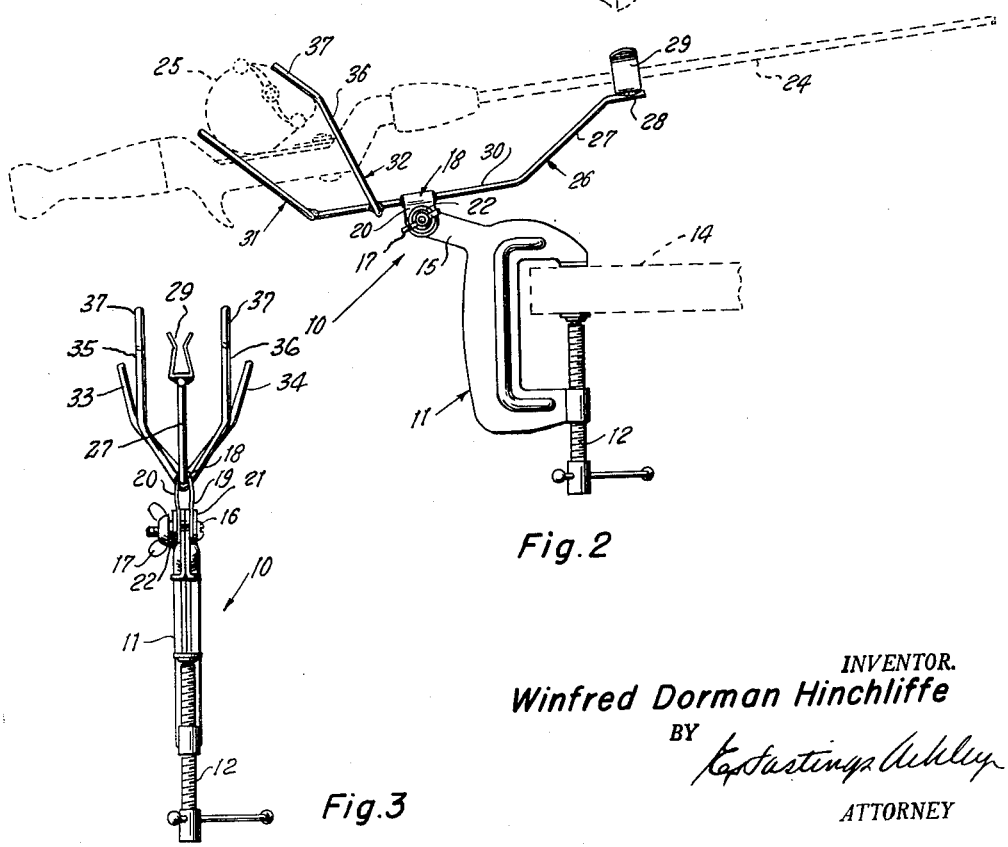
Fig. 2
Fig. 3
INVENTOR.
Winfred Dorman Hinchliffe
BY
ATTORNEY

United States Patent Office 2,917,257
Patented Dec. 15, 1959

2,917,257

SUPPORTS

Winfred Dorman Hinchliffe, Dallas, Tex.

Application August 23, 1954, Serial No. 451,437

3 Claims. (Cl. 248—40)

This invention relates to supports and more particularly to a fishing rod holder.

One object of the invention is to provide a new and improved fishing rod holder.

Another object of the invention is to provide a new and improved fishing rod holder which has means for preventing dislodgment of the rod from the holder in the event a fish pulls very strongly on the line.

Still another object is to provide a fishing rod holder which permits the rod to be easily removed therefrom by a single rearward and upward movement thereof from the holder.

A further object of the invention is to provide a new and improved fishing rod holder which holds the rod firmly and securely and yet which permits removal of the rod therefrom by a single upward and rearward movement of the rod, without complicated manipulation thereof.

Still another object of the invention is to provide a new and improved fishing rod holder of simple economical construction.

Additional objects and advantages of the invention will be readily apparent from the reading of the following description of a device constructed in accordance with the invention, and reference to the accompanying drawings thereof, wherein:

Figure 1 is a perspective view of a fishing rod holder, showing it in operative position secured to a vertical fixed structure;

Figure 2 is a side view of the fishing rod holder showing it in operative position secured to a horizontal fixed structure; and, Figure 3 is a front end view of the fishing rod holder.

Referring now to the drawing, the new and improved fishing rod holder 10 includes a conventional C-clamp 11 provided with a manual clamping screw 12 by means of which the rod holder may be clamped to a vertical fixed structure 13 or a horizontal fixed structure 14, such as the side or seat of a boat. The C-clamp 11 has an outwardly projecting arm 15 extending outwardly from the clamp and angularly away from the clamping screw 12.

The outer end of the C-clamp arm 15 is provided with an aperture through which extends a bolt 16, said bolt being provided with a wing nut 17 for rigidly securing a U-shaped bracket 18 to the arm in any desired adjusted position. This U-shaped bracket has parallel legs 19 and 20 which are disposed on opposite sides of the arm and are provided with registering apertures through which the bolt 16 extends. Washers 21 and 22 are mounted on the bolt 16 adjacent the legs 19 and 20, respectively, of the U-shaped bracket to provide bearing means for the head of the bolt and the wing nut, respectively.

A support 23 for receiving and supporting a fishing rod 24 provided with a reel 25 has an elongate body 26 which extends through the U-shaped bracket and is rigidly secured thereto by welding or any other suitable means. The forward portion 27 of the elongate body is bent upwardly and outwardly and then forwardly as at 28 so that a resilient upwardly opening clip 29 secured to the forward outer end of the elongate body is disposed above the straight central portion 30 of the elongate body and above and forwardly of the arm 15 of the C-clamp.

The support 23 also includes a pair of bifurcated or substantially U-shaped support and catch members 31 and 32 which are secured at longitudinally spaced points to the elongate body rearwardly of the arm 15 of the C-clamp. The rearmost support and catch member 31 has arms 33 and 34 which extend rearwardly and upwardly in a straight line as seen from the side, Figure 2, while the intermediate support and catch member 32 has arms 35 and 36 which extend upwardly and rearwardly and are formed with outer end portions 37 which extend rearwardly at an increased angle from the vertical so as to engage over the upper surfaces of the reel 25 when it is disposed between the two support and catch members. The intermediate support and catch member thus restrains forward movement of the reel, should a pull be exerted on the line and rod and reel by a fish.

The elongate body 26 and the two support and catch members 31 and 32 are formed of a slightly resilient substance such as a heavy wire, so that the two catch members may flex slightly apart to permit the insertion of the reel therebetween, and also permit withdrawal of the reel from in between the catch member when a rearward and upward force is exerted on the rod and reel, as when the handle of the rod is grasped and pulled upwardly and rearwardly by the fisherman user.

The support and catch members 31 and 32 and the spring clip 29 are formed on or secured rigidly to the elongate body 26 by any suitable means, such as forging or welding.

In use, the C-clamp 11 is rigidly secured to a side 13 or a seat 14 of the boat or on any other suitable base, and the elongate body 26 is adjusted to the desired position by unloosening the wing nut 17, to permit the U-shaped bracket 18 and the support 23 carried thereby to pivot about the bolt 16. The wing nut is then tightened to hold the support 23 in the desired position. The user then inserts the reel 25 between the arms of the two support and catch members which flex apart to permit the reel to be so inserted, the forward portion of the rod being releasably inserted between the arms of the spring clip 29.

The rod and reel are then held securely in place by the outer end portions 37 of the arms 35 and 36 of the intermediate support and catch member 32 against any forward force which might be exerted thereon by a pull on the line imparted by a fish. At the same time, however, the fisherman user can very quickly, in one single motion, remove the rod and reel from the support by grasping the handle of the rod 24 and pulling upwardly and rearwardly thereon, the reel moving easily out from between the arms 33 and 34 of the rear support and catch member 31 and the outer end portions 37 of the arms 35 and 36 of the intermediate support and catch member, which outer end portions extend substantially parallel to the arms of the rear support and catch member.

It will now be apparent that a new and improved fishing rod holder has been illustrated and described which has a support 23 pivotally mounted on a C-clamp 11 by means of which it can be secured to a fixed structure. It will also be apparent that the support includes a pair of spaced support and catch members 31 and 32 between which the reel 25 of a fishing rod 24 may be inserted to be held thereby; and that the arms of the bifurcated members are inclined upwardly and rearwardly so that a forward pull on the rod tends to lodge the reel more securely between the support and catch members, while a rearward and upward movement force imparted to the rod and reel will easily release the rod and reel from the support. It will also be evident that the fishing rod holder illustrated and described is of simple economical construction, and that it permits removal of the rod and reel therefrom without the necessity of complicated manipulation of the rod.

The foregoing description of the invention is explanatory only, and changes in the details of the method described and construction illustrated may be made by those skilled in the art, within the scope of the appended claims, without departing from the spirit of the invention.

What I claim and desire to secure by Letters Patent is:

1. A fishing rod holder including: means for detachably securing the holder to a fixed structure; and a support pivotally secured to said means and comprising: an elongate body, a spring clip on the forward end of said body for receiving a rod, and a pair of spaced bifurcated support and catch members disposed one behind the other on the rear end of said elongate body, said support and catch members each having a pair of arms extending rearwardly and upwardly from said body and having outer end portions which are substantially parallel to one another, the rearmost of said support and catch members being straight, the other of said support members having a lower portion extending upward and rearwardly from the elongate body and divergently from said rearmost support and catch member whereby a reel on the fishing rod may be inserted between said members for quick removal by a rearward upward pull thereon.

2. A fishing rod holder including: a C-clamp for detachably securing the holder to a fixed structure; a support comprising: an elongate body, means on the forward end of said elongate body for releasably receiving a rod, and a pair of spaced support and catch members disposed one behind the other extending upwardly and rearwardly from the rear end portion of said elongate body for receiving the reel of the fishing rod therebetween; said support and catch members being bifurcated and having parallel outer end portions, the rearmost of said support and catch members being straight, the other of said support members having a lower portion extending upward and rearwardly from the elongate body and divergently from said rearmost support and catch member.

3. A fishing rod holder including: means for detachably securing the holder to a fixed structure; a support comprising: an elongate body, said elongate body having a substantially straight main portion and an upwardly and forwardly extending forward portion having an outer end portion extending substantially parallel to said main portion, means on said outer end portion for releasably receiving a rod, and a pair of spaced bifurcated support and catch members disposed one behind the other extending upwardly and rearwardly from said main portion for receiving the reel of the fish rod therebetween, said support and catch members being bifurcated and having parallel outer end portions, the rearmost of said support and catch members being straight, the other of said support members having a lower portion extending upward and rearwardly from the elongate body and divergently from said rearmost support and catch member; and means forward of said support and catch members pivotally connecting said main portion to said first mentioned means.

References Cited in the file of this patent

UNITED STATES PATENTS

| | | |
|---|---|---|
| 1,192,112 | Porter | July 26, 1916 |
| 1,788,536 | Merckel | Jan. 13, 1931 |
| 2,143,109 | Hadaway | Jan. 10, 1939 |
| 2,452,279 | Young | Oct. 26, 1948 |
| 2,506,912 | Augustine | May 9, 1950 |
| 2,516,245 | Nickerson | July 25, 1950 |
| 2,522,255 | Climo | Sept. 12, 1950 |